US010152969B2

(12) United States Patent
Reilly et al.

(10) Patent No.: US 10,152,969 B2
(45) Date of Patent: Dec. 11, 2018

(54) VOICE DETECTION BY MULTIPLE DEVICES

(71) Applicant: Sonos, Inc., Santa Barbara, CA (US)

(72) Inventors: Jonathon Reilly, Cambridge, MA (US); Gregory Burlingame, Woburn, MA (US); Christopher Butts, Evanston, IL (US); Romi Kadri, Cambridge, MA (US); Jonathan P. Lang, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 94 days.

(21) Appl. No.: 15/211,748

(22) Filed: Jul. 15, 2016

(65) Prior Publication Data
US 2018/0018964 A1 Jan. 18, 2018

(51) Int. Cl.
G10L 15/00 (2013.01)
G06F 3/00 (2006.01)
G10L 15/22 (2006.01)
G10L 15/02 (2006.01)
G10L 15/34 (2013.01)
G10L 15/20 (2006.01)

(52) U.S. Cl.
CPC ............... *G10L 15/22* (2013.01); *G10L 15/02* (2013.01); *G10L 15/20* (2013.01); *G10L 15/34* (2013.01); *G10L 2015/223* (2013.01)

(58) Field of Classification Search
CPC ... G10L 15/22; G10L 2015/223; G10L 15/26; G10L 15/265; G10L 15/30; G10L 15/08; G10L 15/00; G10L 17/005; G06F 3/167; G06F 3/0482; G06F 3/16

USPC ..................... 704/235, 246, 270, 270.1, 275
See application file for complete search history.

(56) References Cited

U.S. PATENT DOCUMENTS

| 4,741,038 A | 4/1988 | Elko et al. |
| 4,941,187 A | 7/1990 | Slater |
| 5,440,644 A | 8/1995 | Farinelli et al. |
| 5,740,260 A | 4/1998 | Odom |
| 5,761,320 A | 6/1998 | Farinelli et al. |
| 5,923,902 A | 7/1999 | Inagaki |
| 6,032,202 A | 2/2000 | Lea et al. |
| 6,256,554 B1 | 7/2001 | DiLorenzo |
| 6,301,603 B1 | 10/2001 | Maher et al. |

(Continued)

FOREIGN PATENT DOCUMENTS

| AU | 2017100486 A4 | 6/2017 |
| AU | 2017100581 A4 | 6/2017 |

(Continued)

OTHER PUBLICATIONS

US 9,299,346, 03/2016, Hart et al. (withdrawn)

(Continued)

*Primary Examiner* — Edgar X Guerra-Erazo
(74) *Attorney, Agent, or Firm* — McDonnell Boehnen Hulbert & Berghoff LLP

(57) ABSTRACT

Disclosed herein are example techniques for voice detection by multiple NMDs. An example implementation may involve receiving a set of voice recordings from a set of NMDs, and identifying a subset of voice recordings from which to determine a given voice command. The example implementation may further involve causing the identified subset of voice recordings to be analyzed to determine the given voice command.

20 Claims, 6 Drawing Sheets

(56) References Cited

U.S. PATENT DOCUMENTS

| | | |
|---|---|---|
| 6,311,157 B1 | 10/2001 | Strong |
| 6,404,811 B1 | 6/2002 | Cvetko et al. |
| 6,469,633 B1 | 10/2002 | Wachter |
| 6,522,886 B1 | 2/2003 | Youngs et al. |
| 6,594,347 B1 | 7/2003 | Calder et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,661,107 B1 | 2/2010 | Van Dyke et al. |
| 7,702,508 B2 | 4/2010 | Bennett |
| 7,792,311 B1 | 9/2010 | Holmgren et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,041,565 B1 | 10/2011 | Bhardwaj et al. |
| 8,045,952 B2 | 10/2011 | Qureshey et al. |
| 8,073,125 B2 | 12/2011 | Zhang et al. |
| 8,103,009 B2 | 1/2012 | McCarty et al. |
| 8,234,395 B2 | 7/2012 | Millington et al. |
| 8,239,206 B1 | 8/2012 | Lebeau et al. |
| 8,255,224 B2 | 8/2012 | Singleton et al. |
| 8,290,603 B1 | 10/2012 | Lambourne |
| 8,364,481 B2 | 1/2013 | Strope et al. |
| 8,386,261 B2 | 2/2013 | Mellott et al. |
| 8,423,893 B2 | 4/2013 | Ramsay et al. |
| 8,428,758 B2 | 4/2013 | Naik et al. |
| 8,453,058 B1 * | 5/2013 | Coccaro .............. G06Q 10/103 705/319 |
| 8,483,853 B1 | 7/2013 | Lambourne |
| 8,484,025 B1 | 7/2013 | Moreno et al. |
| 8,831,761 B2 | 9/2014 | Kemp et al. |
| 8,831,957 B2 | 9/2014 | Taubman et al. |
| 8,938,394 B1 | 1/2015 | Faaborg et al. |
| 8,942,252 B2 | 1/2015 | Balassanian et al. |
| 8,983,383 B1 | 3/2015 | Haskin |
| 8,983,844 B1 | 3/2015 | Thomas et al. |
| 9,042,556 B2 | 5/2015 | Kallai et al. |
| 9,094,539 B1 | 7/2015 | Noble |
| 9,215,545 B2 | 12/2015 | Dublin et al. |
| 9,251,793 B2 | 2/2016 | Lebeau et al. |
| 9,253,572 B2 | 2/2016 | Bedingfield, Sr. et al. |
| 9,262,612 B2 | 2/2016 | Cheyer |
| 9,288,597 B2 | 3/2016 | Carlsson et al. |
| 9,300,266 B2 | 3/2016 | Grokop |
| 9,318,107 B1 | 4/2016 | Sharifi |
| 9,319,816 B1 | 4/2016 | Narayanan |
| 9,412,392 B2 | 8/2016 | Lindahl et al. |
| 9,426,567 B2 | 8/2016 | Lee et al. |
| 9,431,021 B1 | 8/2016 | Scalise et al. |
| 9,443,527 B1 | 9/2016 | Watanabe et al. |
| 9,472,201 B1 | 10/2016 | Sleator |
| 9,472,203 B1 | 10/2016 | Ayrapetian et al. |
| 9,484,030 B1 * | 11/2016 | Meaney .................. G10L 15/22 |
| 9,489,948 B1 | 11/2016 | Chu et al. |
| 9,494,683 B1 | 11/2016 | Sadek |
| 9,509,269 B1 | 11/2016 | Rosenberg |
| 9,514,752 B2 | 12/2016 | Sharifi |
| 9,536,541 B2 | 1/2017 | Chen et al. |
| 9,548,066 B2 | 1/2017 | Jain et al. |
| 9,552,816 B2 | 1/2017 | Vanlund et al. |
| 9,560,441 B1 | 1/2017 | McDonough, Jr. et al. |
| 9,601,116 B2 | 3/2017 | Casado et al. |
| 9,615,170 B2 | 4/2017 | Kirsch et al. |
| 9,615,171 B1 | 4/2017 | O'Neill et al. |
| 9,632,748 B2 | 4/2017 | Faaborg et al. |
| 9,633,186 B2 | 4/2017 | Ingrassia, Jr. et al. |
| 9,633,368 B2 | 4/2017 | Greenzeiger et al. |
| 9,633,660 B2 | 4/2017 | Haughay et al. |
| 9,633,671 B2 | 4/2017 | Giacobello et al. |
| 9,633,674 B2 | 4/2017 | Sinha et al. |
| 9,640,179 B1 | 5/2017 | Hart et al. |
| 9,640,183 B2 | 5/2017 | Jung et al. |
| 9,641,919 B1 | 5/2017 | Poole et al. |
| 9,646,614 B2 | 5/2017 | Bellegarda et al. |
| 9,653,060 B1 | 5/2017 | Hilmes et al. |
| 9,653,075 B1 | 5/2017 | Chen et al. |
| 9,659,555 B1 | 5/2017 | Hilmes et al. |
| 9,672,821 B2 | 6/2017 | Krishnaswamy et al. |
| 9,685,171 B1 | 6/2017 | Yang |
| 9,691,378 B1 | 6/2017 | Meyers et al. |
| 9,691,379 B1 | 6/2017 | Mathias et al. |
| 9,697,826 B2 | 7/2017 | Sainath et al. |
| 9,697,828 B1 | 7/2017 | Prasad et al. |
| 9,698,999 B2 | 7/2017 | Mutagi et al. |
| 9,704,478 B1 | 7/2017 | Vitaladevuni et al. |
| 9,721,568 B1 | 8/2017 | Polansky et al. |
| 9,721,570 B1 | 8/2017 | Beal et al. |
| 9,728,188 B1 | 8/2017 | Rosen et al. |
| 9,734,822 B1 | 8/2017 | Sundaram et al. |
| 9,747,011 B2 | 8/2017 | Lewis et al. |
| 9,747,899 B2 | 8/2017 | Pogue et al. |
| 9,747,920 B2 | 8/2017 | Ayrapetian et al. |
| 9,747,926 B2 | 8/2017 | Sharifi et al. |
| 9,754,605 B1 | 9/2017 | Chhetri |
| 9,762,967 B2 | 9/2017 | Clarke et al. |
| 9,811,314 B2 | 11/2017 | Plagge et al. |
| 9,813,810 B1 | 11/2017 | Nongpiur |
| 9,820,036 B1 | 11/2017 | Tritschler et al. |
| 9,820,039 B2 | 11/2017 | Lang |
| 9,826,306 B2 * | 11/2017 | Lang .................. H04S 7/301 |
| 9,881,616 B2 | 1/2018 | Beckley et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0034280 A1 | 3/2002 | Infosino |
| 2002/0072816 A1 | 6/2002 | Shdema et al. |
| 2002/0124097 A1 | 9/2002 | Isely et al. |
| 2003/0040908 A1 | 2/2003 | Yang et al. |
| 2003/0072462 A1 | 4/2003 | Hlibowicki |
| 2003/0157951 A1 | 8/2003 | Hasty |
| 2004/0024478 A1 | 2/2004 | Hans et al. |
| 2005/0164664 A1 | 7/2005 | DiFonzo et al. |
| 2005/0195988 A1 | 9/2005 | Tashev et al. |
| 2005/0268234 A1 | 12/2005 | Rossi et al. |
| 2005/0283330 A1 | 12/2005 | Laraia et al. |
| 2006/0147058 A1 | 7/2006 | Wang |
| 2006/0190968 A1 | 8/2006 | Jung et al. |
| 2006/0247913 A1 * | 11/2006 | Huerta .................. G10L 15/22 704/1 |
| 2006/0262943 A1 | 11/2006 | Oxford |
| 2007/0018844 A1 | 1/2007 | Sutardja |
| 2007/0019815 A1 | 1/2007 | Asada et al. |
| 2007/0033043 A1 | 2/2007 | Hyakumoto |
| 2007/0071255 A1 | 3/2007 | Schobben |
| 2007/0076131 A1 | 4/2007 | Li et al. |
| 2007/0140058 A1 | 6/2007 | McIntosh et al. |
| 2007/0142944 A1 | 6/2007 | Goldberg et al. |
| 2008/0090537 A1 | 4/2008 | Sutardja |
| 2008/0248797 A1 | 10/2008 | Freeman et al. |
| 2008/0301729 A1 | 12/2008 | Broos et al. |
| 2009/0003620 A1 | 1/2009 | McKillop et al. |
| 2009/0005893 A1 | 1/2009 | Sugii et al. |
| 2009/0018828 A1 | 1/2009 | Nakadai et al. |
| 2009/0076821 A1 | 3/2009 | Brenner et al. |
| 2009/0197524 A1 | 8/2009 | Haff et al. |
| 2009/0228919 A1 | 9/2009 | Zott et al. |
| 2009/0238377 A1 | 9/2009 | Ramakrishnan et al. |
| 2009/0326949 A1 | 12/2009 | Douthitt et al. |
| 2010/0014690 A1 | 1/2010 | Wolff et al. |
| 2010/0023638 A1 | 1/2010 | Bowman |
| 2010/0075723 A1 | 3/2010 | Min et al. |
| 2010/0179874 A1 | 7/2010 | Higgins et al. |

(56) References Cited

U.S. PATENT DOCUMENTS

| | | |
|---|---|---|
| 2010/0211199 A1 | 8/2010 | Naik et al. |
| 2011/0033059 A1 | 2/2011 | Bhaskar et al. |
| 2011/0091055 A1 | 4/2011 | Leblanc |
| 2011/0145581 A1 | 6/2011 | Malhotra et al. |
| 2011/0267985 A1 | 11/2011 | Wilkinson et al. |
| 2011/0276333 A1 | 11/2011 | Wang et al. |
| 2011/0280422 A1 | 11/2011 | Neumeyer et al. |
| 2011/0299706 A1 | 12/2011 | Sakai |
| 2012/0131125 A1 | 5/2012 | Seidel et al. |
| 2012/0148075 A1 | 6/2012 | Goh et al. |
| 2012/0163603 A1* | 6/2012 | Abe ............... G01S 5/0263 380/278 |
| 2012/0177215 A1 | 7/2012 | Bose et al. |
| 2012/0297284 A1 | 11/2012 | Matthews, III et al. |
| 2013/0006453 A1 | 1/2013 | Wang et al. |
| 2013/0024018 A1* | 1/2013 | Chang ............... G08C 17/02 700/94 |
| 2013/0058492 A1 | 3/2013 | Silzle et al. |
| 2013/0066453 A1 | 3/2013 | Seefeldt |
| 2013/0148821 A1 | 6/2013 | Sorensen |
| 2013/0179173 A1* | 7/2013 | Lee ............... G10L 15/22 704/275 |
| 2013/0183944 A1 | 7/2013 | Mozer et al. |
| 2013/0191122 A1 | 7/2013 | Mason |
| 2013/0216056 A1 | 8/2013 | Thyssen |
| 2013/0317635 A1 | 11/2013 | Bates et al. |
| 2013/0329896 A1 | 12/2013 | Krishnaswamy et al. |
| 2013/0331970 A1 | 12/2013 | Beckhardt et al. |
| 2013/0332165 A1 | 12/2013 | Beckley et al. |
| 2013/0343567 A1 | 12/2013 | Triplett et al. |
| 2014/0003611 A1 | 1/2014 | Mohammad et al. |
| 2014/0003635 A1 | 1/2014 | Mohammad et al. |
| 2014/0006026 A1 | 1/2014 | Lamb et al. |
| 2014/0064501 A1* | 3/2014 | Olsen ............... H04S 7/303 381/58 |
| 2014/0075306 A1 | 3/2014 | Rega |
| 2014/0094151 A1 | 4/2014 | Klappert et al. |
| 2014/0100854 A1 | 4/2014 | Chen et al. |
| 2014/0167931 A1 | 6/2014 | Lee et al. |
| 2014/0195252 A1 | 7/2014 | Gruber et al. |
| 2014/0244013 A1* | 8/2014 | Reilly ............... G06F 3/165 700/94 |
| 2014/0258292 A1 | 9/2014 | Thramann et al. |
| 2014/0270282 A1 | 9/2014 | Tammi et al. |
| 2014/0274185 A1 | 9/2014 | Luna et al. |
| 2014/0277650 A1 | 9/2014 | Zurek et al. |
| 2014/0363022 A1 | 12/2014 | Dizon et al. |
| 2015/0010169 A1* | 1/2015 | Popova ............... H04S 7/303 381/107 |
| 2015/0016642 A1 | 1/2015 | Walsh et al. |
| 2015/0063580 A1 | 3/2015 | Huang et al. |
| 2015/0086034 A1 | 3/2015 | Lombardi et al. |
| 2015/0104037 A1* | 4/2015 | Lee ............... H04R 27/00 381/80 |
| 2015/0154976 A1 | 6/2015 | Mutagi |
| 2015/0180432 A1 | 6/2015 | Gao et al. |
| 2015/0189438 A1* | 7/2015 | Hampiholi ............... G06F 3/165 381/80 |
| 2015/0200454 A1 | 7/2015 | Heusdens et al. |
| 2015/0222987 A1* | 8/2015 | Angel, Jr. ......... G06F 17/30772 381/80 |
| 2015/0228274 A1 | 8/2015 | Leppänen et al. |
| 2015/0253292 A1 | 9/2015 | Larkin et al. |
| 2015/0253960 A1 | 9/2015 | Lin et al. |
| 2015/0271593 A1 | 9/2015 | Sun et al. |
| 2015/0280676 A1 | 10/2015 | Holman et al. |
| 2015/0296299 A1 | 10/2015 | Klippel et al. |
| 2015/0302856 A1 | 10/2015 | Kim et al. |
| 2015/0341406 A1 | 11/2015 | Rockefeller et al. |
| 2015/0363061 A1 | 12/2015 | De Nigris, III et al. |
| 2015/0363401 A1 | 12/2015 | Chen et al. |
| 2015/0371657 A1 | 12/2015 | Gao et al. |
| 2015/0380010 A1 | 12/2015 | Srinivasan |
| 2016/0007116 A1 | 1/2016 | Holman |
| 2016/0021458 A1 | 1/2016 | Johnson et al. |
| 2016/0029142 A1 | 1/2016 | Isaac |
| 2016/0036962 A1 | 2/2016 | Rand et al. |
| 2016/0042748 A1 | 2/2016 | Jain et al. |
| 2016/0057522 A1 | 2/2016 | Choisel et al. |
| 2016/0077710 A1 | 3/2016 | Lewis et al. |
| 2016/0088392 A1 | 3/2016 | Huttunen et al. |
| 2016/0093304 A1 | 3/2016 | Kim et al. |
| 2016/0098393 A1 | 4/2016 | Hebert |
| 2016/0157035 A1 | 6/2016 | Russell et al. |
| 2016/0173578 A1 | 6/2016 | Sharma et al. |
| 2016/0212538 A1 | 7/2016 | Fullam et al. |
| 2016/0225385 A1 | 8/2016 | Hammarqvist |
| 2016/0232451 A1 | 8/2016 | Scherzer |
| 2016/0234204 A1 | 8/2016 | Rishi et al. |
| 2016/0239255 A1 | 8/2016 | Chavez et al. |
| 2016/0260431 A1 | 9/2016 | Newendorp et al. |
| 2016/0314782 A1 | 10/2016 | Klimanis |
| 2016/0352915 A1 | 12/2016 | Gautama |
| 2016/0353218 A1* | 12/2016 | Starobin ............... H04R 27/00 |
| 2017/0003931 A1 | 1/2017 | Dvortsov et al. |
| 2017/0026769 A1 | 1/2017 | Patel |
| 2017/0060526 A1 | 3/2017 | Barton et al. |
| 2017/0070478 A1 | 3/2017 | Park et al. |
| 2017/0076720 A1 | 3/2017 | Gopalan et al. |
| 2017/0078824 A1 | 3/2017 | Heo |
| 2017/0084292 A1 | 3/2017 | Yoo |
| 2017/0090864 A1 | 3/2017 | Jorgovanovic |
| 2017/0092278 A1 | 3/2017 | Evermann et al. |
| 2017/0092297 A1 | 3/2017 | Sainath et al. |
| 2017/0103755 A1 | 4/2017 | Jeon et al. |
| 2017/0125037 A1 | 5/2017 | Shin |
| 2017/0177585 A1 | 6/2017 | Rodger et al. |
| 2017/0178662 A1 | 6/2017 | Ayrapetian et al. |
| 2017/0193999 A1 | 7/2017 | Aleksic et al. |
| 2017/0206896 A1 | 7/2017 | Ko et al. |
| 2017/0214996 A1 | 7/2017 | Yeo |
| 2017/0236512 A1 | 8/2017 | Williams et al. |
| 2017/0242651 A1 | 8/2017 | Lang et al. |
| 2017/0242653 A1* | 8/2017 | Lang ............... H04S 7/301 |
| 2017/0270919 A1 | 9/2017 | Parthasarathi et al. |
| 2017/0353789 A1 | 12/2017 | Kim et al. |
| 2018/0033428 A1 | 2/2018 | Kim et al. |

FOREIGN PATENT DOCUMENTS

| | | |
|---|---|---|
| EP | 1349146 A1 | 10/2003 |
| EP | 1389853 A1 | 2/2004 |
| EP | 2351021 B1 | 9/2017 |
| JP | 2001236093 A | 8/2001 |
| JP | 2004347943 A | 12/2004 |
| JP | 2004354721 A | 12/2004 |
| JP | 2005284492 A | 10/2005 |
| JP | 2008079256 A | 4/2008 |
| JP | 2008158868 A | 7/2008 |
| JP | 2010141748 A | 6/2010 |
| JP | 2013037148 A | 2/2013 |
| JP | 2014071138 A | 4/2014 |
| JP | 2014137590 A | 7/2014 |
| KR | 20100111071 A | 10/2010 |
| WO | 200153994 | 7/2001 |
| WO | 2003093950 A2 | 11/2003 |
| WO | 2015037396 A1 | 3/2015 |
| WO | 2015178950 A1 | 11/2015 |
| WO | 2016033364 A1 | 3/2016 |
| WO | 2017039632 A1 | 3/2017 |

OTHER PUBLICATIONS

"AudioTron Quick Start Guide, Version 1.0", Voyetra Turtle Beach, Inc., Mar. 2001, 24 pages.

"AudioTron Reference Manual, Version 3.0", Voyetra Turtle Beach, Inc., May 2002, 70 pages.

"AudioTron Setup Guide, Version 3.0", Voyetra Turtle Beach, Inc., May 2002, 38 pages.

Bluetooth. "Specification of the Bluetooth System: The ad hoc SCATTERNET for affordable and highly functional wireless connectivity," Core, Version 1.0 A, Jul. 26, 1999, 1068 pages.

(56) References Cited

OTHER PUBLICATIONS

Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo" Analog Stereo Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
UPnP; "Universal Plug and Play Device Architecture," Jun. 8, 2000; version 1.0; Microsoft Corporation; pp. 1-54.
"Denon 2003-2004 Product Catalog," Denon, 2003-2004, 44 pages.
Non-Final Office Action dated Dec. 12, 2016, issued in connection with U.S. Appl. No. 15/098,718, filed Apr. 14, 2016, 11 pages.
Non-Final Office Action dated Jan. 13, 2017, issued in connection with U.S. Appl. No. 15/098,805, filed Apr. 14, 2016, 11 pages.
United States Patent and Trademark Office, U.S. Appl. No. 60/490,768, filed Jul. 28, 2003, entitled "Method for synchronizing audio playback between multiple networked devices", 13 pages.
United States Patent and Trademark Office, U.S. Appl. No. 60/825,407, filed Sep. 12, 2003, entitled "Controlling and manipulating groupings in a multi-zone music or media system", 82 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Lang Jonathan et al., "Default Playback Device Designation", U.S. Appl. No. 15/098,867, dated Apr. 14, 2016.
Jarvis Simon et al., "Action based on User ID", U.S. Appl. No. 15/131,776, dated Apr. 18, 2016.
Corrected Notice of Allowability dated Mar. 8, 2017, issued in connection with U.S. Appl. No. 15/229,855, filed Aug. 5, 2016, 6 pages.
Final Office Action dated Jun. 15, 2017, issued in connection with U.S. Appl. No. 15/098,718, filed Apr. 14, 2016, 15 pages.
International Searching Authority, International Search Report and Written Opinion dated May 23, 2017, issued in connection with International Application No. PCT/US2017/018739, Filed Feb. 21, 2017, 10 pages.
International Searching Authority, International Search Report and Written Opinion dated May 30, 2017, issued in connection with International Application No. PCT/US2017/018728, Filed Feb. 21, 2017, 11 pages.
Non-Final Office Action dated Jun. 1, 2017, issued in connection with U.S. Appl. No. 15/223,218, filed Jul. 29, 2016, 7 pages.
Non-Final Office Action dated Feb. 7, 2017, issued in connection with U.S. Appl. No. 15/131,244, filed Apr. 18, 2016, 12 pages.
Non-Final Office Action dated Feb. 8, 2017, issued in connection with U.S. Appl. No. 15/098,892, filed Apr. 14, 2016, 17 pages.
Non-Final Office Action dated Mar. 9, 2017, issued in connection with U.S. Appl. No. 15/098,760, filed Apr. 14, 2016, 13 pages.
Non-Final Office Action dated Apr. 19, 2017, issued in connection with U.S. Appl. No. 15/131,776, filed Apr. 18, 2016, 12 pages.
Non-Final Office Action dated Jul. 25, 2017, issued in connection with U.S. Appl. No. 15/273,679, filed Jul. 22, 2016, 11 pages.
Non-Final Office Action dated Jan. 26, 2017, issued in connection with U.S. Appl. No. 15/098,867, filed Apr. 14, 2016, 16 pages.
Non-Final Office Action dated Jun. 30, 2017, issued in connection with U.S. Appl. No. 15/277,810, filed Sep. 27, 2016, 13 pages.

Notice of Allowance dated Jul. 12, 2017, issued in connection with U.S. Appl. No. 15/098,805, filed Apr. 14, 2016, 8 pages.
Notice of Allowance dated Feb. 14, 2017, issued in connection with U.S. Appl. No. 15/229,855, filed Aug. 5, 2016, 11 pages.
Notice of Allowance dated Jun. 14, 2017, issued in connection with U.S. Appl. No. 15/282,554, filed Sep. 30, 2016, 11 pages.
Advisory Action dated Jun. 28, 2018, issued in connection with U.S. Appl. No. 15/438,744, filed Feb. 21, 2017, 3 pages.
European Patent Office, European Extended Search Report dated Oct. 30, 2017, issued in connection with EP Application No. 17174435.2, 11 pages.
Final Office Action dated Oct. 6, 2017, issued in connection with U.S. Appl. No. 15/098,760, filed Apr. 14, 2016, 25 pages.
Final Office Action dated Aug. 11, 2017, issued in connection with U.S. Appl. No. 15/131,776, filed Apr. 18, 2016, 7 pages.
Final Office Action dated Apr. 13, 2018, issued in connection with U.S. Appl. No. 15/131,254, filed Apr. 18, 2016, 18 pages.
Final Office Action dated Apr. 13, 2018, issued in connection with U.S. Appl. No. 15/438,744, filed Feb. 21, 2017, 20 pages.
Fiorenza Arisio et al. "Deliverable 1.1 User Study, analysis of requirements and definition of the application task," May 31, 2012, http://dirha.fbk.eu/sites/dirha/fbk.eu/files/docs/DIRHA_D1.1., 31 pages.
Freiberger, Karl, "Development and Evaluation of Source Localization Algorithms for Coincident Microphone Arrays," Diploma Thesis, Apr. 1, 2010, 106 pages.
International Searching Authority, International Search Report and Written Opinion dated Nov. 22, 2017, issued in connection with International Application No. PCT/US2017/054063, filed Sep. 28, 2017, 11 pages.
International Searching Authority, International Search Report and Written Opinion dated Oct. 23, 2017, issued in connection with International Application No. PCT/US2017/042170, filed Jul. 14, 2017, 15 pages.
International Searching Authority, International Search Report and Written Opinion dated Oct. 24, 2017, issued in connection with International Application No. PCT/US2017/042227, filed Jul. 14, 2017, 16 pages.
Morales-Cordovilla et al. "Room Localization for Distant Speech Recognition," Proceedings of Interspeech 2014, Sep. 14, 2014, 4 pages.
Non-Final Office Action dated Nov. 2, 2017, issued in connection with U.S. Appl. No. 15/584,782, filed May 2, 2017, 11 pages.
Non-Final Office Action dated Nov. 3, 2017, issued in connection with U.S. Appl. No. 15/438,741, filed Feb. 21, 2017, 11 pages.
Non-Final Office Action dated Jan. 10, 2018, issued in connection with U.S. Appl. No. 15/098,718, filed Apr. 14, 2016, 15 pages.
Non-Final Office Action dated Jan. 10, 2018, issued in connection with U.S. Appl. No. 15/229,868, filed Aug. 5, 2016, 13 pages.
Non-Final Office Action dated Jan. 10, 2018, issued in connection with U.S. Appl. No. 15/438,725, filed Feb. 21, 2017, 15 pages.
Non-Final Office Action dated Sep. 14, 2017, issued in connection with U.S. Appl. No. 15/178,180, filed Jun. 9, 2016, 16 pages.
Non-Final Office Action dated Mar. 16, 2018, issued in connection with U.S. Appl. No. 15/681,937, filed Aug. 21, 2017, 5 pages.
Non-Final Office Action dated Apr. 18, 2018, issued in connection with U.S. Appl. No. 15/811,468, filed Nov. 13, 2017, 14 pages.
Non-Final Office Action dated May 22, 2018, issued in connection with U.S. Appl. No. 15/946,599, filed Apr. 5, 2018, 19 pages.
Non-Final Office Action dated Oct. 26, 2017, issued in connection with U.S. Appl. No. 15/438,744, filed Feb. 21, 2017, 12 pages.
Non-Final Office Action dated Jun. 27, 2018, issued in connection with U.S. Appl. No. 15/438,749, filed Feb. 21, 2017, 16 pages.
Non-Final Office Action dated Feb. 6, 2018, issued in connection with U.S. Appl. No. 15/211,689, filed Jul. 15, 2016, 32 pages.
Non-Final Office Action dated Feb. 6, 2018, issued in connection with U.S. Appl. No. 15/237,133, filed Aug. 15, 2016, 6 pages.
Non-Final Office Action dated Sep. 6, 2017, issued in connection with U.S. Appl. No. 15/131,254, filed Apr. 18, 2016, 13 pages.
Non-Final Office Action dated Apr. 9, 2018, issued in connection with U.S. Appl. No. 15/804,776, filed Nov. 6, 2017, 18 pages.
Non-Final Office Action dated May 9, 2018, issued in connection with U.S. Appl. No. 15/818,051, filed Nov. 20, 2017, 22 pages.

(56) References Cited

OTHER PUBLICATIONS

Notice of Allowance dated Dec. 4, 2017, issued in connection with U.S. Appl. No. 15/277,810, filed Sep. 27, 2016, 5 pages.
Notice of Allowance dated Apr. 11, 2018, issued in connection with U.S. Appl. No. 15/719,454, filed Sep. 28, 2017, 15 pages.
Notice of Allowance dated Dec. 13, 2017, issued in connection with U.S. Appl. No. 15/784,952, filed Oct. 16, 2017, 9 pages.
Notice of Allowance dated Aug. 14, 2017, issued in connection with U.S. Appl. No. 15/098,867, filed Apr. 14, 2016, 10 pages.
Notice of Allowance dated Dec. 15, 2017, issued in connection with U.S. Appl. No. 15/223,218, filed Jul. 29, 2016, 7 pages.
Notice of Allowance dated Aug. 16, 2017, issued in connection with U.S. Appl. No. 15/098,892, filed Apr. 14, 2016, 9 pages.
Notice of Allowance dated Aug. 17, 2017, issued in connection with U.S. Appl. No. 15/131,244, filed Apr. 18, 2016, 9 pages.
Notice of Allowance dated Mar. 20, 2018, issued in connection with U.S. Appl. No. 15/784,952, filed Oct. 16, 2017, 7 pages.
Notice of Allowance dated Aug. 22, 2017, issued in connection with U.S. Appl. No. 15/273,679, filed Sep. 22, 2016, 5 pages.
Notice of Allowance dated Jan. 22, 2018, issued in connection with U.S. Appl. No. 15/178,180, filed Jun. 9, 2016, 9 pages.
Notice of Allowance dated Dec. 29, 2017, issued in connection with U.S. Appl. No. 15/131,776, filed Apr. 18, 2016, 13 pages.
Notice of Allowance dated Mar. 9, 2018, issued in connection with U.S. Appl. No. 15/584,782, filed May 2, 2017, 8 pages.
Tsiami et al. "Experiments in acoustic source localization using sparse arrays in adverse indoors environments", 2014 22nd European Signal Processing Conference, Sep. 1, 2014, 5 pages.
Vacher at al. "Recognition of voice commands by multisource ASR and noise cancellation in a smart home environment" Signal Processing Conference 2012 Proceedings of the 20th European, IEEE, Aug. 27, 2012, 5 pages.
Xiao et al. "A Learning-Based Approach to Direction of Arrival Estimation in Noisy and Reverberant Environments," 2015 IEEE International Conference on Acoustics, Speech and Signal Processing, Apr. 19, 2015, 5 pages.

\* cited by examiner

VOICE DETECTION BY MULTIPLE DEVICES

CROSS-REFERENCE TO RELATED APPLICATIONS

The present application incorporates herein by reference the entire contents of U.S. application Ser. No. 15/098,867, filed Apr. 14, 2016, titled "Default Playback Device Designation."

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
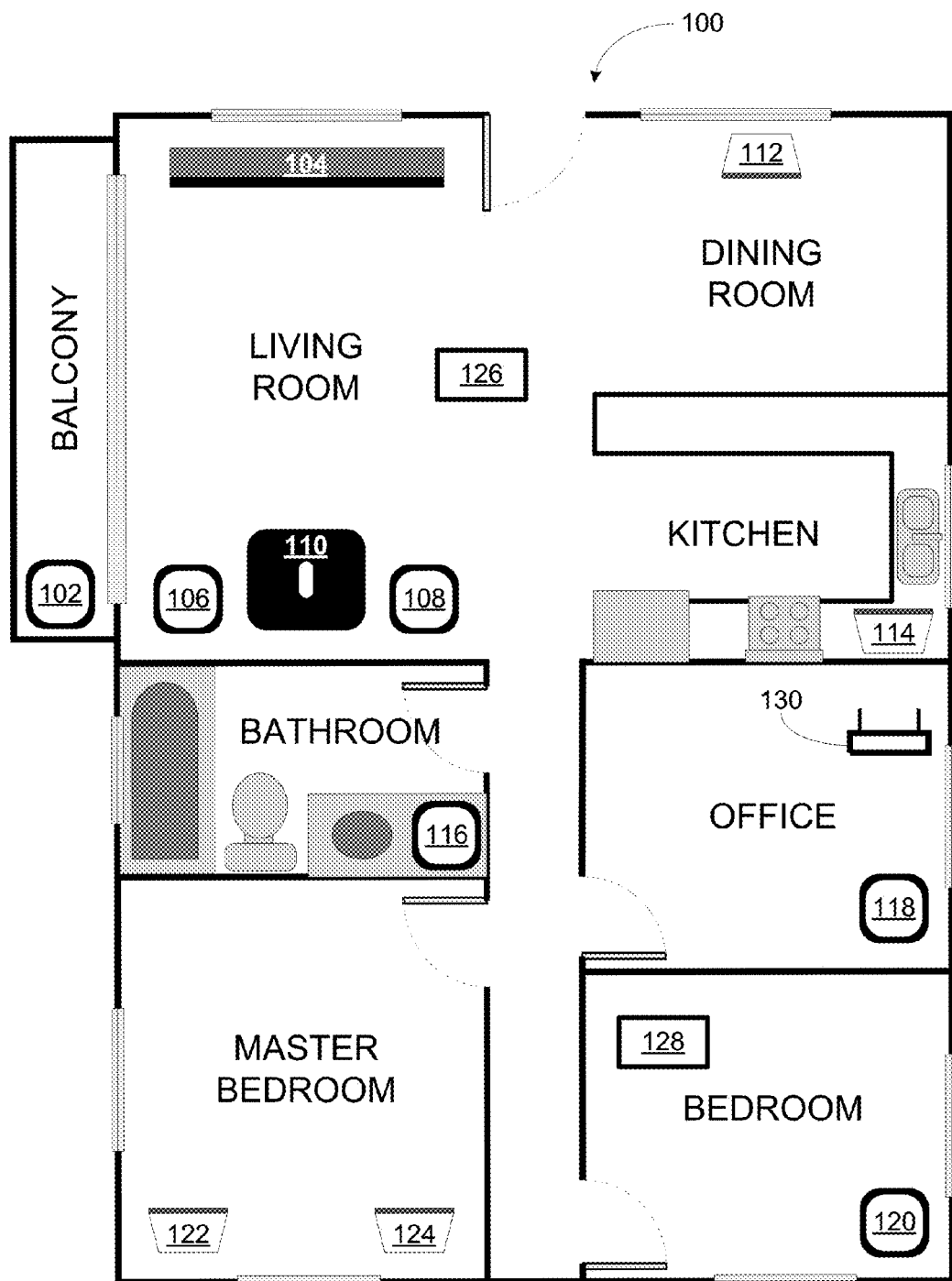
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Listening to media content out loud can be a social activity that involves family, friends, and guests. Media content may include, for instance, talk radio, books, audio from television, music stored on a local drive, music from media sources (e.g., Pandora® Radio, Spotify®, Slacker®, Radio, Google Play™, iTunes Radio), and other audible material. In a household, for example, people may play music out loud at parties and other social gatherings. In such an environment, people may wish to play the music in one listening zone or multiple listening zones simultaneously, such that the music in each listening zone may be synchronized, without audible echoes or glitches.

Such an experience may be enriched when voice commands are used to control an audio playback device or system, among other devices in a household (e.g., lights). For example, a user may wish to change the audio content, playlist, or listening zone, add a music track to a playlist or playback queue, or change a playback setting (e.g., play, pause, next track, previous track, playback volume, and EQ settings, among others) using various voice commands. Some example audio playback devices or systems may include a microphone to detect such voice commands.

In some cases, listening to media content out loud is an individual experience. For example, an individual may play music out loud for themselves in the morning before work, during a workout, in the evening during dinner, or at other times throughout the day at home or at work. For these individual experiences, the individual may choose to limit the playback of audio content to a single listening zone or area. Such an experience may be enriched when an individual can use a voice command to choose a listening zone, audio content, and playback settings, among other settings.

In some instances, networked microphone devices (NMDs) may be used to control a household. An NMD may be, for example, a SONOS® playback device, server, or system capable of receiving voice input via a microphone. Additionally, an NMD may be a device other than a SONOS® playback device, server, or system (e.g., AMAZON® ECHO®, APPLE® IPHONE®) capable of receiving voice inputs via a microphone. U.S. application Ser. No. 15/098,867 entitled, "Default Playback Device Designation," which is hereby incorporated by reference, provides examples of voice-enabled household architectures.

In some conventional approaches, a single NMD may independently receive or process voice inputs or commands. Indeed, some commercially-available devices contemplate the presence of a single NMD. Accordingly, in a situation where multiple such conventional NMDs are present in a single location, the conventional NMDs might react independently to a single voice input. In such a household in which multiple NMDs are present, coordinating and identifying a set of NMDs from which to determine a voice command from the voice recordings of respective NMDs may provide an improved voice recognition technique that enhances user experience.

In some examples, NMDs in a given household may each have one or more microphones to record voice inputs or commands from a user. A computing device may receive a set of respective voice recordings from one or more NMDs and process the voice recordings locally at the computing device or remotely on another device that is connected to the computing device by way of one or more networks. For example, the computing device may communicate with a networked microphone system server, one or more NMDs, playback devices, and/or another computing device to receive or process voice recordings. In some embodiments, the computing device, media playback system server and/or networked microphone system server may be cloud-based server systems. In other embodiments, the computing device itself may be an NMD, playback device, or any other device or server described herein.

The computing device may identify, among the set of voice recordings received from multiple NMDs, which voice recordings to process to determine a given voice command. For instance, in some embodiments, the voice input from any NMD that registers the voice input is processed. Alternatively, the computing device may identify a subset of the recordings. This subset might include any NMD that registered a given voice command at or above a given threshold (e.g., a threshold sound pressure level). As another example, this subset might include voice inputs from a pre-defined number of NMDs (e.g., the three NMDs registering the voice command at or above a given threshold). Other examples are possible as well.

For example, the computing devices may select from among multiple recorded voice inputs based on pre-determined rules. To illustrate, where the NMDs are playback devices, a subset of voice inputs may be selected for processing based on zone configurations of the playback devices. For instance, recordings of a given command from multiple playback devices joined together as a bonded pair (e.g., a stereo pair or surround sound configuration) may be processed together. In some cases, recordings from devices outside the bonded zone may be ignored. As another example, recordings of a given command from multiple zones that are grouped together (as a zone group) may be processed together. Further examples are contemplated as well.

The computing device may cause the identified subset of voice recordings to be analyzed to determine the given voice command. In other words, voice recordings of multiple NMDs may be processed to determine a single voice command. Processing a particular subset of voice recordings may improve accuracy in refining and processing the voice recordings, which in turn may enable a higher-quality speech-to-text conversion of voice commands. More particularly, refining the identified recordings may prevent duplicate, redundant, or separate processing of the same voice recordings (or same portions of a voice recording). In further instances, identifying a subset of voice recordings may reduce processing time in determining a given voice command, perhaps by avoiding duplicate, redundant, or separate processing of the same voice recordings. Examples are described further herein.

NMDs may continuously record or start recording in response to a trigger, among other examples. For instance, a given NMD might continuously record ambient noise but might only provide its recording to the computing device (to possibly be included in processing) if the given NMD (1) itself is woken up by a wake-up word or voice input, or (2) receives an instruction from another device to provide the recording to the computing device. In such implementations, processing of recordings of the given NMD may be triggered, despite the given NMD not necessarily registering a far-field voice input itself (e.g., by registering a wake-up word or voice input).

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments. Moreover, the examples described herein may extend to a multitude of embodiments formed by combining the example features in any suitable manner.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
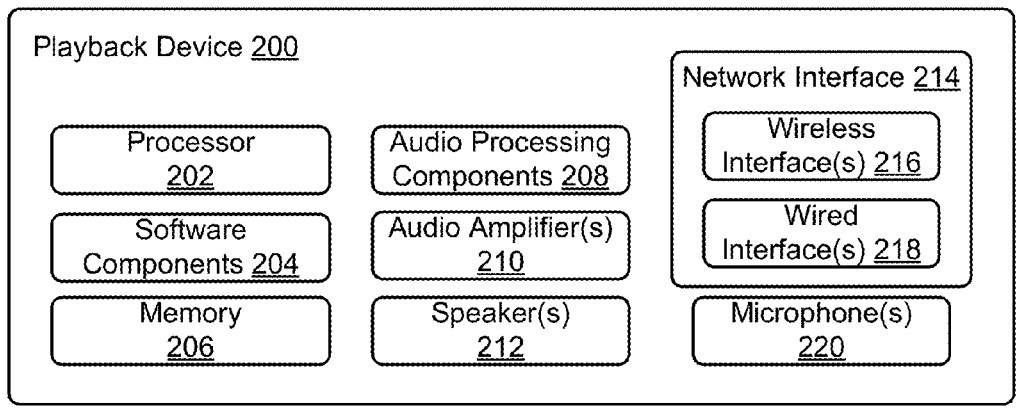
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, a network interface 214 including wireless interface(s) 216 and wired interface(s) 218, and microphone(s) 220. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

The microphone(s) 220 may be arranged to detect sound in the environment of the playback device 200. For instance, the microphone(s) may be mounted on an exterior wall of a housing of the playback device. The microphone(s) may be any type of microphone now known or later developed such as a condenser microphone, electret condenser microphone, or a dynamic microphone. The microphone(s) may be sensitive to a portion of the frequency range of the speaker(s) 220. One or more of the speaker(s) 220 may operate in reverse as the microphone(s) 220. In some aspects, the playback device 200 might not include the microphone(s) 220.

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
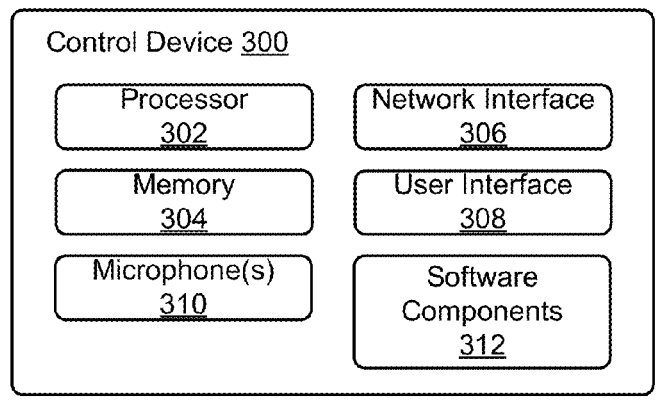
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, a user interface 308, microphone(s) 310, and software components 312. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™)

The processor 302 may be configured to perform functions relevant to facilitating user access, control, and configuration of the media playback system 100. The memory 304 may be data storage that can be loaded with one or more of the software components executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Control device 300 may include microphone(s) 310. Microphone(s) 310 may be arranged to detect sound in the environment of the control device 300. Microphone(s) 310 may be any type of microphone now known or later developed such as a condenser microphone, electret condenser microphone, or a dynamic microphone. The microphone(s) may be sensitive to a portion of a frequency range. Two or more microphones 310 may be arranged to capture location information of an audio source (e.g., voice, audible sound) and/or to assist in filtering background noise.

Figure 4:
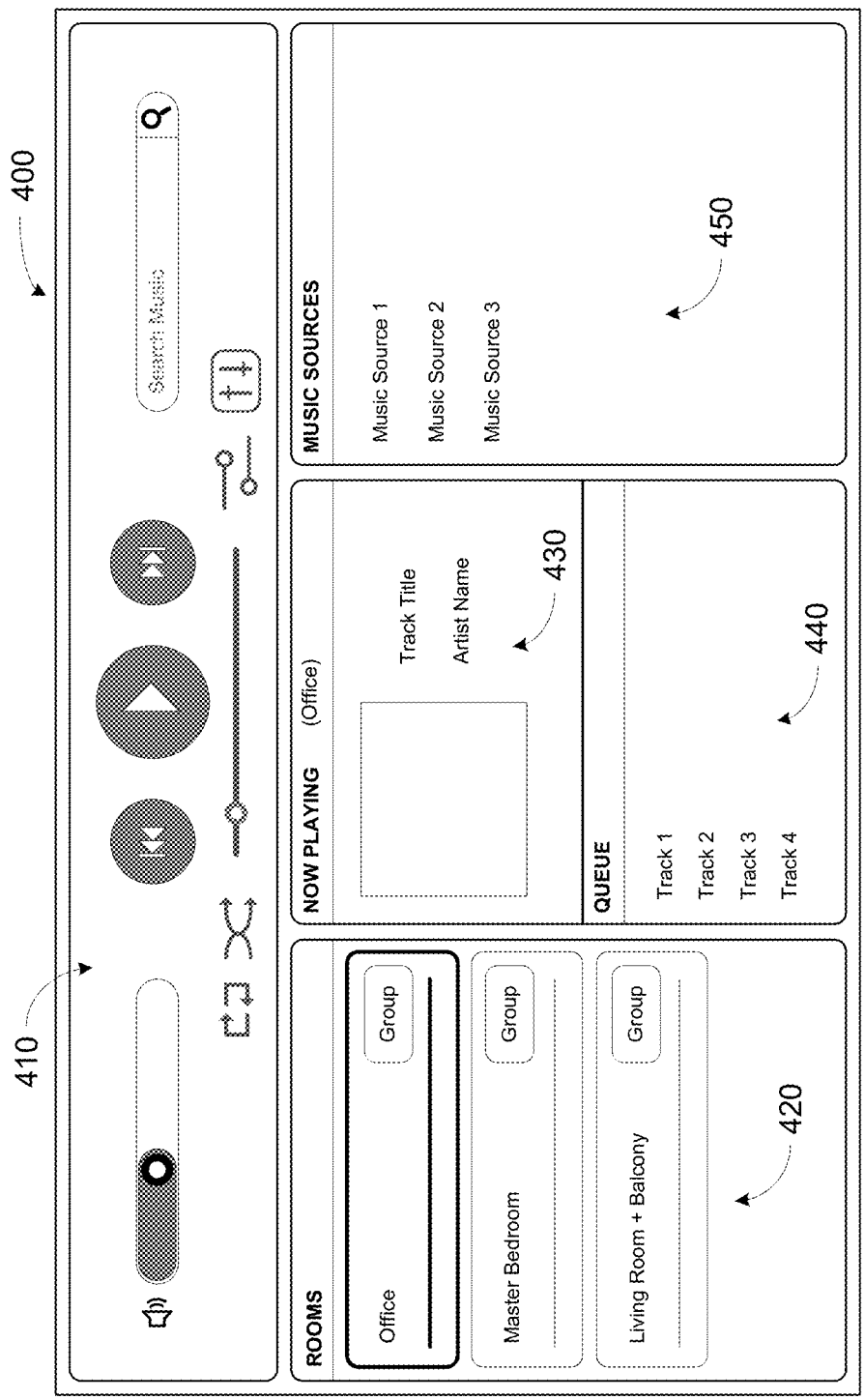
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

e. Example Plurality of Networked Devices

Figure 5:
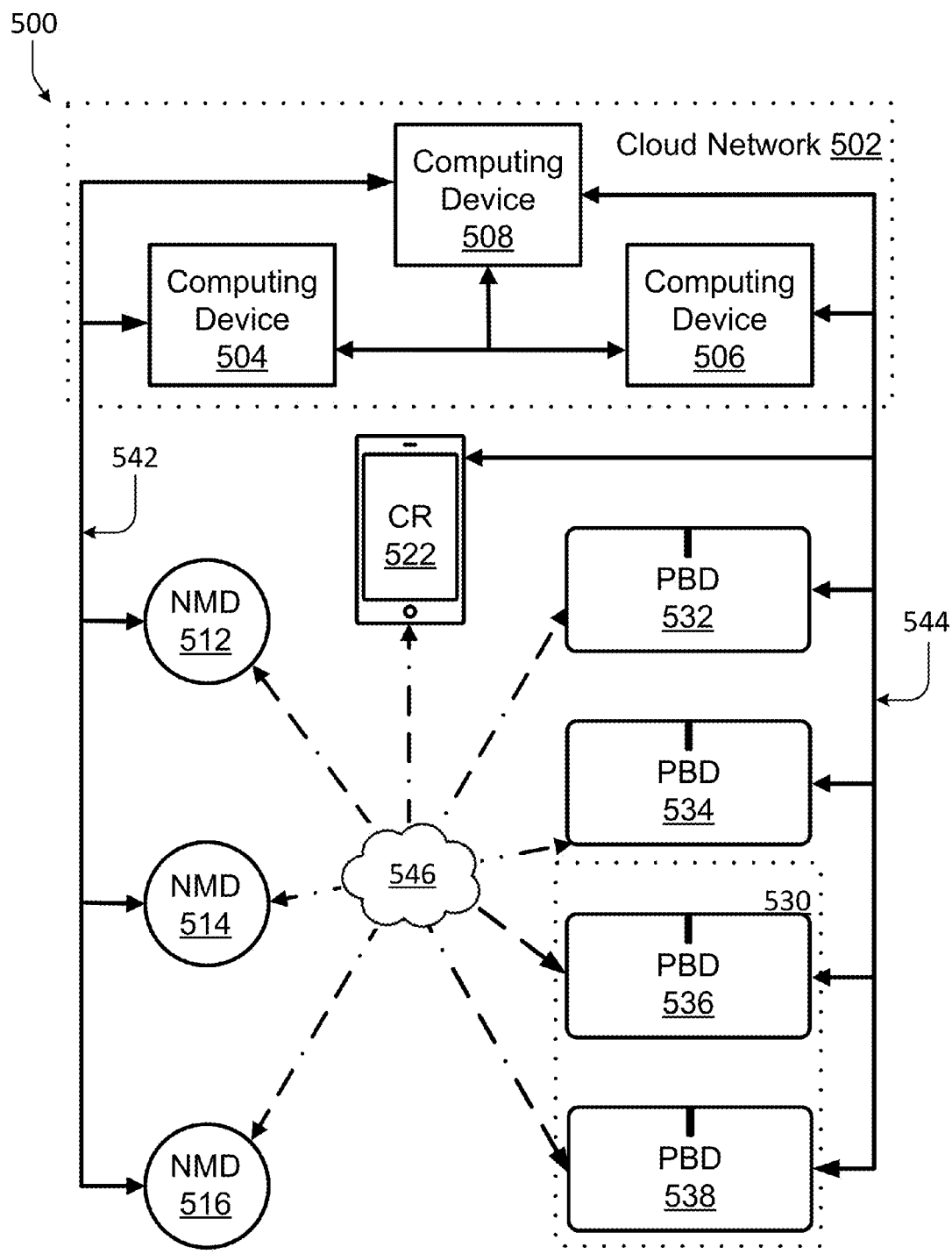
FIG. 5 shows an example plurality of network devices.

FIG. 5 shows an example plurality of devices 500 that may be configured to provide an audio playback experience based on voice control. One having ordinary skill in the art will appreciate that the devices shown in FIG. 5 are for illustrative purposes only, and variations including different and/or additional devices may be possible. As shown, the plurality of devices 500 includes computing devices 504, 506, and 508; network microphone devices (NMDs) 512, 514, and 516; playback devices (PBDs) 532, 534, 536, and 538; and a controller device (CR) 522.

Each of the plurality of devices 500 may be network-capable devices that can establish communication with one or more other devices in the plurality of devices according to one or more network protocols, such as NFC, Bluetooth, Ethernet, and IEEE 802.11, among other examples, over one or more types of networks, such as wide area networks (WAN), local area networks (LAN), and personal area networks (PAN), among other possibilities.

As shown, the computing devices 504, 506, and 508 may be part of a cloud network 502. The cloud network 502 may include additional computing devices. In one example, the computing devices 504, 506, and 508 may be different servers. In another example, two or more of the computing devices 504, 506, and 508 may be modules of a single server. Analogously, each of the computing device 504, 506, and 508 may include one or more modules or servers. For ease of illustration purposes herein, each of the computing devices 504, 506, and 508 may be configured to perform particular functions within the cloud network 502. For instance, computing device 508 may be a source of audio content for a streaming music service.

As shown, the computing device 504 may be configured to interface with NMDs 512, 514, and 516 via communication path 542. NMDs 512, 514, and 516 may be components of one or more "Smart Home" systems. In one case, NMDs 512, 514, and 516 may be physically distributed throughout a household, similar to the distribution of devices shown in FIG. 1. In another case, two or more of the NMDs 512, 514, and 516 may be physically positioned within relative close proximity of one another. Communication path 542 may comprise one or more types of networks, such as a WAN including the Internet, LAN, and/or PAN, among other possibilities.

In one example, one or more of the NMDs 512, 514, and 516 may be devices configured primarily for audio detection. In another example, one or more of the NMDs 512, 514, and 516 may be components of devices having various primary utilities. For instance, as discussed above in connection to FIGS. 2 and 3, one or more of NMDs 512, 514, and 516 may be the microphone(s) 220 of playback device 200 or the microphone(s) 310 of network device 300. Further, in some cases, one or more of NMDs 512, 514, and 516 may be the playback device 200 or network device 300. In an example, one or more of NMDs 512, 514, and/or 516 may include multiple microphones arranged in a microphone array.

As shown, the computing device 506 may be configured to interface with CR 522 and PBDs 532, 534, 536, and 538 via communication path 544. In one example, CR 522 may be a network device such as the network device 200 of FIG. 2. Accordingly, CR 522 may be configured to provide the controller interface 400 of FIG. 4. Similarly, PBDs 532, 534, 536, and 538 may be playback devices such as the playback device 300 of FIG. 3. As such, PBDs 532, 534, 536, and 538 may be physically distributed throughout a household as shown in FIG. 1. For illustration purposes, PBDs 536 and 538 may be part of a bonded zone 530, while PBDs 532 and 534 may be part of their own respective zones. As described above, the PBDs 532, 534, 536, and 538 may be dynamically bonded, grouped, unbonded, and ungrouped. Communication path 544 may comprise one or more types of networks, such as a WAN including the Internet, LAN, and/or PAN, among other possibilities.

In one example, as with NMDs 512, 514, and 516, CR 522 and PBDs 532, 534, 536, and 538 may also be components of one or more "Smart Home" systems. In one case, PBDs 532, 534, 536, and 538 may be distributed throughout the same household as the NMDs 512, 514, and 516. Further, as suggested above, one or more of PBDs 532, 534, 536, and 538 may be one or more of NMDs 512, 514, and 516.

The NMDs 512, 514, and 516 may be part of a local area network, and the communication path 542 may include an access point that links the local area network of the NMDs 512, 514, and 516 to the computing device 504 over a WAN (communication path not shown). Likewise, each of the NMDs 512, 514, and 516 may communicate with each other via such an access point.

Similarly, CR 522 and PBDs 532, 534, 536, and 538 may be part of a local area network and/or a local playback network as discussed in previous sections, and the communication path 544 may include an access point that links the local area network and/or local playback network of CR 522 and PBDs 532, 534, 536, and 538 to the computing device 506 over a WAN. As such, each of the CR 522 and PBDs 532, 534, 536, and 538 may also communicate with each over such an access point.

In one example, a single access point may include communication paths 542 and 544. In an example, each of the NMDs 512, 514, and 516, CR 522, and PBDs 532, 534, 536, and 538 may access the cloud network 502 via the same access point for a household.

As shown in FIG. 5, each of the NMDs 512, 514, and 516, CR 522, and PBDs 532, 534, 536, and 538 may also directly communicate with one or more of the other devices via communication means 546. Communication means 546 as described herein may involve one or more forms of communication between the devices, according to one or more network protocols, over one or more types of networks, and/or may involve communication via one or more other network devices. For instance, communication means 546 may include one or more of for example, Bluetooth™ (IEEE 802.15), NFC, Wireless direct, and/or Proprietary wireless, among other possibilities.

In one example, CR 522 may communicate with NMD 512 over Bluetooth™, and communicate with PBD 534 over another local area network. In another example, NMD 514 may communicate with CR 522 over another local area network, and communicate with PBD 536 over Bluetooth. In a further example, each of the PBDs 532, 534, 536, and 538 may communicate with each other according to a spanning tree protocol over a local playback network, while each communicating with CR 522 over a local area network, different from the local playback network. Other examples are also possible.

In some cases, communication means between the NMDs 512, 514, and 516, CR 522, and PBDs 532, 534, 536, and 538 may change depending on types of communication between the devices, network conditions, and/or latency demands. For instance, communication means 546 may be used when NMD 516 is first introduced to the household with the PBDs 532, 534, 536, and 538. In one case, the NMD 516 may transmit identification information corresponding to the NMD 516 to PBD 538 via NFC, and PBD 538 may in response, transmit local area network information to NMD 516 via NFC (or some other form of communication). However, once NMD 516 has been configured within the household, communication means between NMD 516 and PBD 538 may change. For instance, NMD 516 may subsequently communicate with PBD 538 via communication path 542, the cloud network 502, and communication path 544. In another example, the NMDs and PBDs may never communicate via local communications means 546. In a further example, the NMDs and PBDs may communicate primarily via local communications means 546. Other examples are also possible.

In an illustrative example, NMDs 512, 514, and 516 may be configured to receive voice inputs to control PBDs 532, 534, 536, and 538. The available control commands may include any media playback system controls previously discussed, such as playback volume control, playback transport controls, music source selection, and grouping, among other possibilities. In one instance, NMD 512 may receive a voice input to control one or more of the PBDs 532, 534, 536, and 538. In response to receiving the voice input, NMD 512 may transmit via communication path 542, the voice input to computing device 504 for processing. In one example, the computing device 504 may convert the voice input to an equivalent text command, and parse the text command to identify a command. Computing device 504 may then subsequently transmit the text command to the computing device 506. In another example, the computing device 504 may convert the voice input to an equivalent text command, and then subsequently transmit the text command to the computing device 506. The computing device 506 may then parse the text command to identify one or more playback commands.

For instance, if the text command is "Play 'Track 1' by 'Artist 1' from 'Streaming Service 1' in 'Zone 1'," The computing device 506 may identify (i) a URL for "Track 1" by "Artist 1" available from "Streaming Service 1," and (ii) at least one playback device in "Zone 1." In this example, the URL for "Track 1" by "Artist 1" from "Streaming Service 1" may be a URL pointing to computing device 508, and "Zone 1" may be the bonded zone 530. As such, upon identifying the URL and one or both of PBDs 536 and 538, the computing device 506 may transmit via communication path 544 to one or both of PBDs 536 and 538, the identified URL for playback. One or both of PBDs 536 and 538 may responsively retrieve audio content from the computing device 508 according to the received URL, and begin playing "Track 1" by "Artist 1" from "Streaming Service 1."

One having ordinary skill in the art will appreciate that the above is just one illustrative example, and that other implementations are also possible. In one case, operations performed by one or more of the plurality of devices 500, as described above, may be performed by one or more other devices in the plurality of device 500. For instance, the conversion from voice input to the text command may be alternatively, partially, or wholly performed by another device or devices, such as NMD 512, computing device 506, PBD 536, and/or PBD 538. Analogously, the identification of the URL may be alternatively, partially, or wholly performed by another device or devices, such as NMD 512, computing device 504, PBD 536, and/or PBD 538.

f. Example Network Microphone Device

Figure 6:
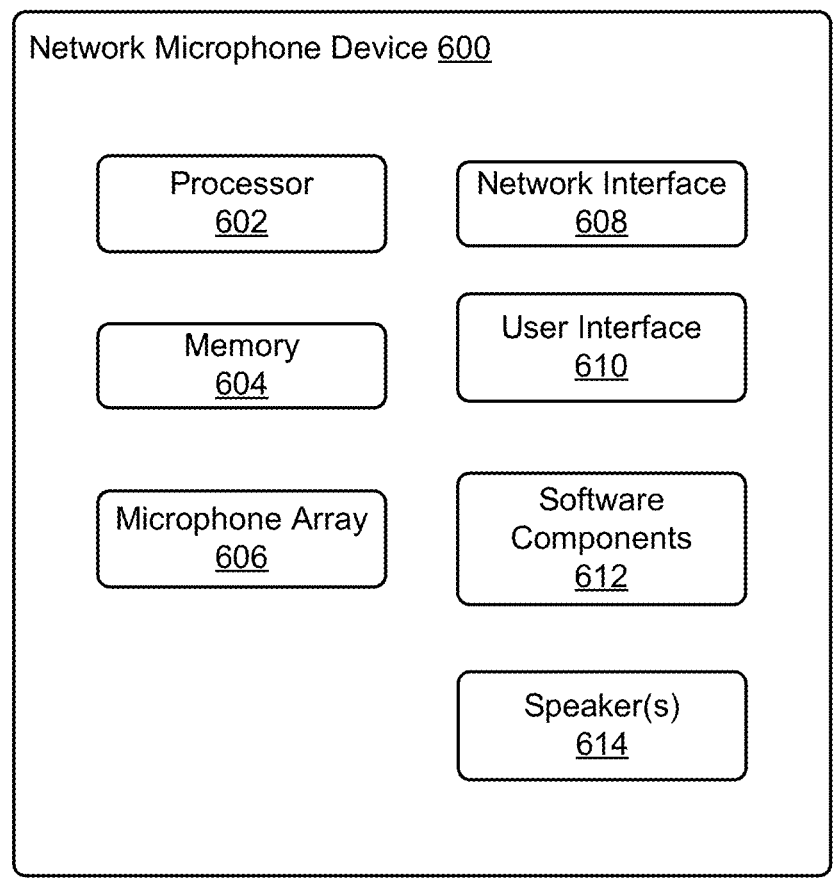
FIG. 6 shows a functional block diagram of an example network microphone device.

FIG. 6 shows a function block diagram of an example network microphone device 600 that may be configured to be one or more of NMDs 512, 514, and 516 of FIG. 5. As shown, the network microphone device 600 includes a processor 602, memory 604, a microphone array 606, a network interface 608, a user interface 610, software components 612, and speaker(s) 614. One having ordinary skill in the art will appreciate that other network microphone device configurations and arrangements are also possible. For instance, network microphone devices may alternatively exclude the speaker(s) 614 or have a single microphone instead of microphone array 606.

The processor 602 may include one or more processors and/or controllers, which may take the form of a general or special-purpose processor or controller. For instance, the processing unit 602 may include microprocessors, microcontrollers, application-specific integrated circuits, digital signal processors, and the like. The memory 604 may be data storage that can be loaded with one or more of the software components executable by the processor 602 to perform those functions. Accordingly, memory 604 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, and/or an optical-storage device, among other possibilities.

The microphone array 606 may be a plurality of microphones arranged to detect sound in the environment of the network microphone device 600. Microphone array 606 may include any type of microphone now known or later developed such as a condenser microphone, electret condenser microphone, or a dynamic microphone, among other possibilities. In one example, the microphone array may be arranged to detect audio from one or more directions relative to the network microphone device. The microphone array 606 may be sensitive to a portion of a frequency range. In one example, a first subset of the microphone array 606 may be sensitive to a first frequency range, while a second subset of the microphone array may be sensitive to a second frequency range. The microphone array 606 may further be arranged to capture location information of an audio source (e.g., voice, audible sound) and/or to assist in filtering background noise. Notably, in some embodiments the microphone array may consist of only a single microphone, rather than a plurality of microphones.

The network interface 608 may be configured to facilitate wireless and/or wired communication between various network devices, such as, in reference to FIG. 5, CR 522, PBDs 532-538, computing device 504-508 in cloud network 502, and other network microphone devices, among other possibilities. As such, network interface 608 may take any suitable form for carrying out these functions, examples of which may include an Ethernet interface, a serial bus interface (e.g., FireWire, USB 2.0, etc.), a chipset and antenna adapted to facilitate wireless communication, and/or any other interface that provides for wired and/or wireless communication. In one example, the network interface 608 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on).

The user interface 610 of the network microphone device 600 may be configured to facilitate user interactions with the network microphone device. In one example, the user interface 608 may include one or more of physical buttons, graphical interfaces provided on touch sensitive screen(s) and/or surface(s), among other possibilities, for a user to directly provide input to the network microphone device 600. The user interface 610 may further include one or more of lights and the speaker(s) 614 to provide visual and/or audio feedback to a user. In one example, the network microphone device 600 may further be configured to playback audio content via the speaker(s) 614.

III. Example Systems and Methods for Voice Detection by Multiple NMDs

As discussed above, in some examples, a computing device may facilitate and coordinate voice recordings of multiple NMDs to determine a voice command. Example voice commands may include commands to modify any of the media playback system controls or playback settings. Playback settings may include, for example, playback volume, playback transport controls, music source selection, and grouping, among other possibilities. Other voice commands may include operations to adjust television control or play settings, mobile phone device settings, or illumination devices, among other device operations. As more household devices become "smart" (e.g., by incorporating a network interface), voice commands may be used to control these household devices.

Generally, it should be understood that one or more functions described herein may be performed by the computing device individually or in combination with the media playback system server, networked microphone system server, PBDs 532-538, NMDs 512-516, CR 522, or any other devices described herein. Alternatively, the computing device itself may be the media playback system server, networked microphone system server, one of the PBDs 532-538, one of the NMDs 512-516, CR 522, or any other device described herein.

Figure 7:
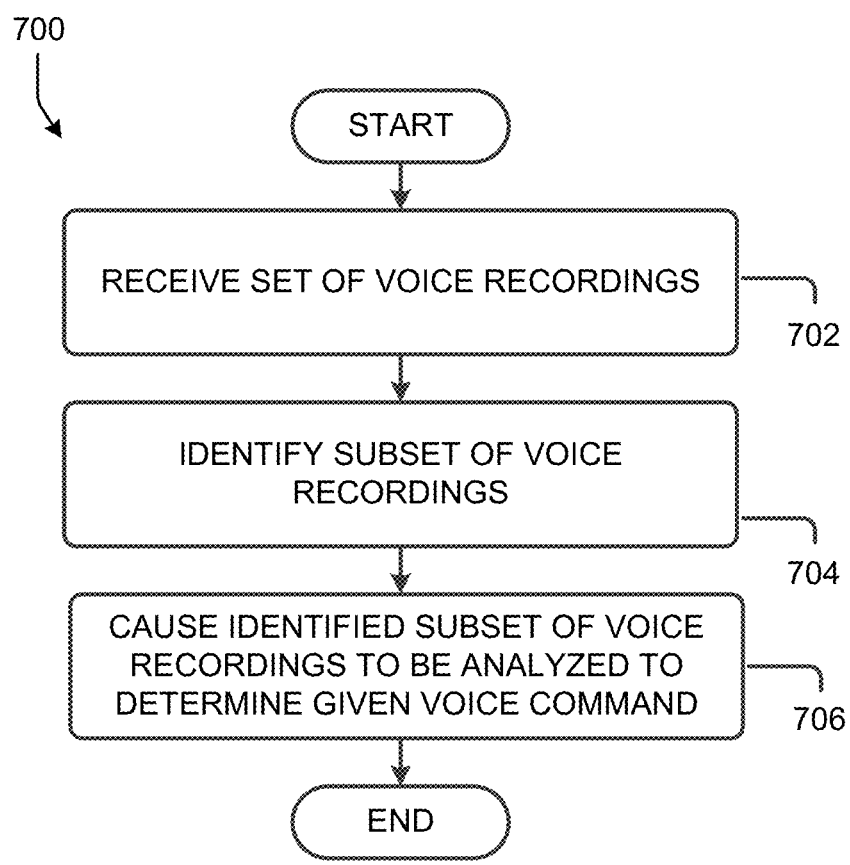
FIG. 7 shows a technique according to example embodiments.

Implementation 700 shown in FIG. 7 presents an embodiment of example techniques described herein. Implementation 700 can be implemented within an operating environment including or involving, for example, the media playback system 100 of FIG. 1, one or more playback devices 200 of FIG. 2, one or more control devices 300 of FIG. 3, the user interface of FIG. 4, and/or the configuration shown in FIG. 5. Implementation 700 may include one or more operations, functions, or actions as illustrated by one or more of blocks 702-706. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the implementation 700 and other processes and methods disclosed herein, the flowchart shows functionality and operation of one possible implementation of some embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as tangible, non-transitory computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the implementation 700 and other processes and methods disclosed herein, each block in FIG. 7 may represent circuitry that is wired to perform the specific logical functions in the process.

a. Receive Set of Voice Recordings

At block 702, implementation 700 involves receiving a set of voice recordings. For instance, a computing device, such as computing device 506, may receive a set of voice recordings from one or more NMDs. In some embodiments, a given NMD may have one or more microphones to record voice inputs or commands from a user. For example, one or more NMDs located in or near the living room of a household may record a voice input from a user located in the living room. Additionally, the computing device itself may operate as an NMD and include one or more microphones to record voice input inputs or commands.

In some instances, the computing device may receive voice recordings via a network interface of the computing device, perhaps in addition to receiving voice recordings via a microphone of the computing device. For example, the computing device may communicate and receive voice recordings from the media playback system server, networked microphone system server, PBDs 532-538, NMDs 512-516, CR 522, or any other devices described herein. In some embodiments, the media playback system server and/or networked microphone system server may be cloud-based server systems. The processing NMD may receive voice recordings from any one or a combination of these devices and/or servers.

An NMD may be continuously recording ambient noise (e.g., listening for voice inputs) via one or more microphones. The continuous recording may be stored in a ring or circular buffer, wherein the recording may be discarded unless the recording is needed for processing and determining a given voice command. The buffer may be stored locally and/or remotely via any of the devices or servers described herein.

In other embodiments, some NMDs might not continuously record ambient noise. Rather, in some instances, one or more NMDs may receive a voice input or indication that instructs the one or more NMDs to "wake up" and start recording voice inputs or commands. For example, the computing device 506 may receive a voice input and, in certain situations described herein, send an indication to one or more NMDs to start recording. In other examples, one or more NMDs may receive a specific "wake-up word" (e.g., "hey Sonos", "Siri", "Alexa") that triggers the one or more NMDs to start recording or listen for a voice command.

An NMD may send its voice recording to the computing device upon detecting a voice command or upon being instructed to send its recordings, among other options. For instance, an NMD may transmit a voice recording of a given voice command after registering that voice command (e.g., by registering a voice command preceded by a wake-up word). Alternatively, another NMD or other device may register a voice command and instruct the NMD to transmit recent recordings to the computing device.

In further examples, the computing device may receive only some of the voice recordings from multiple NMDs. The selected voice recording may be provided to the computing device based on various criteria described further herein. For instance, a given NMD might provide its recording to the computing device if the recording meets certain criteria (e.g., that the voice recording was registered at or above a threshold sound pressure level). As another example, another device may register a voice command and, if the registered voice command satisfies certain criteria, may instruct the NMD to transmit recent recordings corresponding to the voice command to the computing device.

Within examples, the voice recordings from multiple NMDs may be refined, processed, and/or combined into a single voice input before the computing device receives the voice recordings. By way of example, the media playback system server may receive voice recordings from one or more NMDs, such as 512-516. In some embodiments, PBDs 532-538 may be configured as NMDs, and the media playback system server may receive voice recordings from PBDs 532-538. The media playback system may refine, process, and/or combine the voice recordings into a single voice input and send the single voice input to the computing device for further processing. Other examples involving the combination of devices and/or servers described herein are possible.

In some examples, the computing device may receive voice recordings from multiple NMDs at different sound pressure levels. For example, a first NMD that is proximate to a user may recorded the user's voice command at a higher sound pressure level voice recording of the user's voice command relative to a second NMD that is further away from the user. As another example, a user might not be stationary when providing the voice command (e.g., a user might moving from the living room to the bedroom). In such instances, a first NMD may have recorded a higher sound-pressure-level voice recording of a first portion of a user's voice command and a second NMD may have recorded a higher sound-pressure-level recording of a second portion of a user's voice command, as caused by the movement of the user while speaking the voice command.

In some cases, multiple NMDs may have recorded identical portions of a user's voice input. For example, a first and second NMD may be proximate to each other and may have each been listening for a voice input. In other cases, multiple NMDs may have recorded different portions of a user's voice input (e.g., the content of the recordings might not overlap at all or might overlap to some degree). By way of example, the second NMD might not have been initially listening for a voice input or a user might not have been nearby (or may have moved to another location while providing a voice input). After the first NMD detects a first portion of a voice command, the first NMD may instruct the second NMD to start recording, which may cause the second NMD to detect a second portion of the voice command. Alternatively, as noted above, the second NMD may be continuously recording, and the computing device may instruct the second NMD to send the portion of its recordings corresponding to the voice command to the computing device.

As noted above, the computing device may itself operate as an NMD. In some cases, the computing device may register a voice command and perhaps instruct other NMDs to record the voice command. For instance, the computing device may record at least a first portion of a given voice command via one or more microphones of the computing device, and cause one or more NMDs to record at least a second portion of the given voice command.

In some implementations, a given NMD may continuously record ambient noise but might only provide its recording to the computing device if the given NMD (1) itself is woken up by a wake-up word or voice input, or (2) receives an instruction from another NMD, device, or system to provide the recording to the computing device. For example, a first NMD may be continuously recording and may, in some instances, record at least a portion of a given voice command received from a user. A second NMD may cause the first NMD to send the voice recording to the computing device via the network interface. In such examples, processing of a particular portion of continuous recordings by a given NMD may be triggered, despite the given NMD not necessarily registering a far-field voice input itself.

To illustrate, referring back to FIG. 1, a user may speak a particular voice command while walking from the Master Bedroom zone to the Bathroom zone. Playback device 122 (and/or playback device 124), operating as NMDs, may register the user's voice as a voice command by way of a wake-up word spoken while the user was in the Master Bedroom. Playback device 122 may record a first portion of the particular voice command. Playback devices 116, 118, and 120 may be instructed to send a portion of their recordings corresponding to the time period when playback device 122 detected the voice command. Given that the user moved to the Bathroom zone in this example, playback device 116 may detect a second portion of the particular voice command and send this second portion to a computing device for processing with the recording of the first portion of the particular voice command made by playback device 122. In this example, a recording made by playback device 116 is processed, despite playback device 116 not registering the voice command itself.

Additionally or alternatively, a given NMD that may be recording ambient noise and/or at least a portion of a given voice command may receive an instruction from another NMD, device, or system to stop recording. Such embodiments may prevent duplicate or separate processing of the same voice input and may provide faster processing of voice recordings to determine the given voice command.

In some implementations, various NMDs may be configured to operate jointly, which may influence which recordings are transmitted to the computing device. For instance, some NMDs may include playback device functionality (or vice versa). As noted above, playback devices may form various groupings (e.g., bonded zones or zone groups, among other examples). When an NMD that is in a group detects a voice command, that NMD may instruct other NMDs in the group to transmit their recordings corresponding to the voice command to the computing device.

For instance, a computing device may receive a first voice recording corresponding to at least a first portion of the given voice command from a first NMD (e.g., a PBD configured as an NMD). While (or after) the computing device receives the first voice recording, the computing device may determine that the first NMD and a second NMD are paired devices (or bonded playback devices) that typically play media content in synchrony with other playback devices. Based on determining that the first and second NMDs are paired devices, the computing device may cause the second NMD to record and provide a second voice recording corresponding to at least a second portion of the given voice command. In some instances in which the second NMD was continuously recording, the computing device may cause the second NMD to provide the voice recording to the computing device. Alternatively, the computing device may cause the second NMD to stop recording to prevent duplicate processing of the same voice input.

In further examples, the computing device may receive a first voice recording corresponding to at least a first portion of the given voice command from a first NMD (e.g., a PBD configured as an NMD). While (or after) the computing device receives the first voice recording, the computing device may determine that the first NMD and one or more other NMDs are part of a zone group that typically play media content in synchrony within the playback zone. In some instances, the computing device may determine that the first NMD and one or more other NMDs are part of a zone scene (e.g., playback devices that are located on a first floor of a household, or playback devices that are grouped at 5 pm on weekdays). Based on such determination, the computing device may cause the one or more other NMDs to record and provide a second voice recording corresponding to at least a second portion of the given voice command. In some instances in which the one or more other NMDs were continuously recording, the computing device may cause the one or more other NMDs to provide the voice recording to the computing device. Alternatively, the computing device may cause the one or more other NMDs to stop recording to prevent duplicate processing of the same voice input.

In some embodiments, a user may define a voice input or command identifying a set of NMDs (e.g., PBDs configured as NMDs) that may be used together as bonded devices, playback zones, and/or zone scenes to record a portion of a given voice command. In such embodiments, the computing device may receive a user-defined command identifying a set of NMDs that are grouped together as a bonded pair, playback zone, or zone scene. Accordingly, the computing device may cause one or more NMDs that are grouped together to record and/or provide a portion of the given voice command. For example, a user may define "downstairs" as part of a given voice command that identifies a set of NMDs in the basement of a household as a zone scene. The computing device may cause one or more of the identified NMDs that are part of the basement zone scene to record the user's voice input corresponding to the given voice command.

In other embodiments, the computing device may cause a set of NMDs that are grouped together as a bonded pair, playback zone, or zone scene to record and/or provide a given voice command when a pre-defined condition is triggered. For example, the computing device may cause a set of NMDs that are part of a zone group to record and/or provide at least a portion of a given voice command only when the user's command is for playback purposes to for instance, watch a movie, or control one or more playback settings (e.g., play or pause a song, play the next or previous song, adjust volume, etc).

In further embodiments, the computing device may learn that a set of NMDs are commonly grouped together as a zone scene to operate jointly (e.g., to play media content in synchrony). Such learning may be based on the configuration history of the NMDs. For instance, an example configuration history may indicate that the set of NMDs have been grouped together on more than a threshold number of instances. As noted above, to illustrate, such a zone scene might include NMDs that are located on a given floor of a house, NMDs that are in listening proximity of one another, NMDs that are commonly grouped together at a particular time (e.g., party mode on weekends) or other scenes. Accordingly, in response to receiving a portion of a given voice command from a first NMD in a particular zone scene, the computing device may cause one or more other NMDs that have been commonly grouped together with the first NMD to record and/or provide at least a portion of the given voice command to the computing device.

In still further embodiments, the computing device may receive a first voice recording of at least a portion of a given voice command from a first NMD, and determine the orientation or direction of the given voice command relative to the first NMD (e.g., relative direction in which a user faces while recording the voice command). Based on the direction of the given voice command relative to the first NMD, the computing device (or any other device/server) may cause a second NMD to listen and record a second voice recording that represents at least a portion of the given voice command.

To illustrate, referring back to FIG. 1, playback device 104 may detect a voice command coming from the direction of the hallway between the bathroom and office zones. Given the direction of the voice command, playback device 116 and/or playback device 118 may be instructed to record and/or transmit recordings corresponding to the voice command to the computing device.

As a further example, referring still to FIG. 1, a user may move from the living room towards the master bedroom. As the user moves, a playback device in the living room (e.g., playback device 104) may send an indication to a second NMD in the bedroom that the second NMD may start recording and/or preprocessing in anticipation of the user's voice command or input. For example, the first NMD may send an indication to the second NMD to start filtering noise outside the fundamental frequency band for human voice (e.g., 85-255 Hz). In other instances, one or more microphones of the second NMD may be steered toward the direction in which the user faces (e.g., entry of the bedroom). Such example embodiments may be accomplished based on determining the orientation or direction of the given voice command relative to the NMDs as described further herein.

Within examples, the media playback system, computing device, and/or NMD receiving a voice command may acknowledge the identity of the particular user providing the voice command to disambiguate from other voice inputs (e.g., other speakers, television, etc). In some instances, the media playback system, computing device, and/or NMD may identify the particular user based on user profiles or voice configuration settings stored in the media playback system and/or one or more combinations of devices described herein. User profiles information may be shared between any of the devices via a network interface. Example user profiles may include voice characteristics that include the tone or frequency of the particular user's voice, age, gender, and user history, among other information identifying the particular user.

In example operations, referring back to FIG. 1, a user may move from the living room towards the master bedroom while providing a voice command. As the user moves, a playback device in the living room (e.g., playback device 104) may identify the user based on the user's profile and send an indication to a second NMD in the bedroom that the second NMD may start recording and/or preprocessing in anticipation of the user's voice command or input. Knowing the identity of the user, the playback device 104 in the living room and the second NMD in the bedroom may disambiguate voice inputs from a television nearby that may interfere with recordings of the user's voice command.

In other instances, the media playback system, computing device, and/or NMD may identify the particular user in response to determining the voice characteristic of the user while receiving a portion of a user's voice input at a particular location. By way of example, referring back to FIG. 1, a male user may be in the master bedroom that may have one or more NMDs (e.g., playback device 122, 124). While the male user provides a voice command or input near or within the master bedroom, the one or more NMDs may acknowledge the identity of the user and determine the voice characteristic (e.g., frequency or tone of male user's voice) of the user. As the user moves away from the master bedroom, the one or more NMDs in the master bedroom may send the voice characteristic to other NMDs located in other living spaces nearby (e.g., bathroom, living room, etc) and instruct the other NMDs to actively listen for voice inputs matching the voice characteristic of the user to disambiguate voice inputs from other sources (e.g., television, female user, etc).

In further instances, an NMD at a particular location may receive a voice command or input that may trigger a time period or window for the NMD or any one or more other NMDs to actively listen for additional voice inputs or commands. In some examples, a wake-up word or phrase (e.g., Hey Sonos) may trigger a time period or window for one or more NMDs to actively listen for additional voice inputs or commands. In other examples, one or more NMDs receiving at least a portion of a voice input may trigger the time period or window for one or more other NMDs to actively listen for additional voice inputs or commands. Within examples, one or more NMDs receiving at least a portion of a voice input may acknowledge the identity of the particular user and trigger the time period or window for one or more other NMDs to actively listen for additional voice inputs or commands from the particular user.

In some implementations, the time period or window may expire after a certain duration of time (e.g., one minute after one or more NMDs receive an initial voice input). In other implementations, a user may specify the time period or window for one or more NMDs to receive additional voice inputs or commands. In particular, one or more NMDs may receive a voice command (e.g., "let's queue up some songs for a minute") that specifies a time period or window (e.g., one minute) for one or more NMDs to actively listen for additional voice inputs (e.g., voice inputs to add songs to a playback queue). In further implementations, one or more NMDs may close or key off the time period or window for receiving additional voice inputs before such time period or window expires. U.S. application Ser. No. 15/131,776 entitled, "Action based on User ID," which is hereby incorporated by reference describes further examples.

In some embodiments, orientation or direction may be determined based on frequency response of the voice inputs or commands. Generally, an NMD that a user is facing while recording a voice input or command may have a larger high-frequency component than an NMD that the user is not facing. Analysis of such components may indicate to the computing device directionality of a voice command. For instance, given (1) data representing the frequency responses of the respective microphones of multiple NMDs and (2) separate time-aligned recordings of the voice inputs by multiple NMDs, a computing device may normalize the frequency response (e.g., 35 Hz-22.05 kHz) of the respective recordings of the voice inputs with respect to the low frequency band. For instance, the frequency response of the voice inputs recorded from a first NMD may be normalized with a second NMD with respect to the fundamental frequency band for human voice (e.g., 85-255 Hz). The high-frequency components of the normalized responses of the voice inputs may then be compared to determine the direction in which the user is facing while recording the voice command.

In other embodiments, orientation or direction of a voice input may be determined by using the variance in the known polar responses of two or more microphones of an NMD. The variance may help determine the angle of the user (or voice input) relative to an NMD, perpendicular to the plane of the two or more microphones. The angle of the user relative to an NMD may help more precisely locate the direction in which the user is facing while recording the voice input and may add an additional level of confidence that the voice input was received from a certain direction or orientation. Such angles may be identified by measuring the polar responses of the voice inputs at each microphone simultaneously and matching the variance with the known polar responses.

In further embodiments, the angle of the user relative to an NMD may be determined by measuring the delay across two or more microphones with a known distance between them. Further examples may include visual imaging, measuring the relative magnitude across two or more microphones or NMDs, Bluetooth proximity detection between an NMD and another computing device, such as a mobile phone, or monitoring WiFi Received Signal Strength Indication (RSSI) to detect user proximity and/or location.

b. Identify Subset of Voice Recordings

At block 704, implementation 700 involves identifying a subset of voice recordings. For instance, the computing device (e.g., computing device 506) may identify, among the set of voice recordings, a subset of voice recordings from which to determine a given voice command. Alternatively, the computing device may use all of the voice recordings received from respective NMDs to determine a given voice command.

In some instances, identifying the subset of voice recordings may include a device other than the computing device (e.g., the media playback server) locally or remotely (via a network interface) determining the subset of voice recordings and providing the subset to the computing device. Some implementations may involve one or more combinations of devices or servers other than the computing device determining the subset of voice recordings.

In some embodiments, the computing device may identify a subset of voice recordings by comparing the received voice recordings from a set of NMDs with a threshold sound pressure level or threshold volume level. The threshold, for example, may be an absolute threshold such as magnitude or a relative threshold that may be normalized according to the highest-magnitude of the voice recordings. In some embodiments, the computing device may identify the voice recordings (or NMDs) that exceed the threshold level as the subset of voice recordings (or NMDs) to determine the given voice command. In other embodiments, the computing device may identify a predetermined number of NMDs (e.g., three NMDs) that recorded at least a portion of the given voice command at the highest sound pressure levels to determine the given voice command. Identifying the subset of voice recordings in such manner may ensure greater accuracy in refining and processing the voice recordings and enable a higher-quality speech to text conversion to determine a given voice command.

In other embodiments, the computing device may identify the voice recordings of NMDs based on various rules or criteria. For instance, voice recordings from NMDs that are grouped together as bonded pairs, playback zones, and/or zone scenes may be identified as the subset of voice recordings from which to determine the given voice command.

Identifying the subset of voice recordings in such manner may be useful when a voice command is invoked for playback purposes. For example, NMDs in the living room and kitchen of a household may record at least a portion of a user's voice command. The computing device may identify the voice recordings of NMDs in the living room as the subset of voice recordings from which to determine the given voice command. In other examples, a set of NMDs in the living room may record at least a portion of a user's voice command. The computing device may identify the voice recordings of a pair of NMDs in the living room that are bonded together as the subset of voice recordings from which to determine the given voice command.

In further examples, a set of NMDs on the first and second floor of a household may record at least a portion of a user's voice command. The computing device may identify the voice recordings of the NMDs on the first floor as the subset of voice recordings from which to determine the given voice command. In some instances, as described above, the computing device may identify the voice recordings of NMDs that have been commonly grouped together as a zone scene on a threshold number of instances as the subset of voice recordings from which to determine the given voice command.

In other embodiments, the computing device may identify two or more voice recordings of NMDs that are acoustically coupled as the subset of voice recordings from which to determine the given voice command. In some instances, the computing device may cause an NMD to determine whether it is acoustically coupled to one or more other NMDs. For example, the computing device may cause a first NMD to play or output a test tone (or any other audio content) and may cause a second NMD to detect the tone via one or more microphones of the second NMD. The computing device may compare the magnitude of the detected test tone with a threshold sound pressure level to determine whether the first and second NMD are acoustically coupled. In other examples, the first NMD may be playing audio content and the second NMD may register the audio content via one or more microphones. The computing device may compare the magnitude of the registered audio content with a threshold sound pressure level to determine whether the first and second NMD are acoustically coupled. Based on the acoustic coupling of two more NMDs, the computing device may identify such NMDs as the subset from which to determine the given voice command.

c. Cause Identified Subset of Voice Recordings to be Analyzed to Determine Given Voice Command At block 706, implementation 700 involves causing the identified subset of voice recordings to be analyzed to determine the given voice command. For instance, the computing device, such as computing device 506, may cause a subset of voice recordings to be analyzed to determine the given voice command.

In some cases, the computing device may analyze the subset of voice recordings itself. Alternatively, any one or a combination of the devices or servers described herein may cause the identified subset of voice recordings to be analyzed to determine the given voice command, which may be facilitated by one or more networks connecting the devices (e.g., connection means 546).

In some examples, the computing device may cause the identified subset of voice recordings to be analyzed by communicating with an NMD. The computing device may send the identified recordings to the NMD, and the NMD may determine and execute the voice command. Within examples, the computing device may determine the given voice command from the identified subset of voice recordings and send the determined voice command to the NMD to execute the voice command. Other examples involving one or a combination of the devices or servers described herein are possible.

In some embodiments, the computing device may cause the identified subset of voice recordings to be analyzed to determine the given voice command by processing and refining the identified subset of voice recordings. Alternatively, the computing device may process the identified subset of voice recordings without refinement. Refining the identified recordings, however, may enable a higher-quality speech to text conversion. In some implementations, the subset of voice recordings may be refined before identifying the subset of voice recordings. For example, computing device 506 may receive a set of voice recordings and refine the voice recordings locally or remotely before identifying the subset of voice recordings. In other examples, the set of voice recordings may be refined by one or more combination of devices or servers before the computing device (e.g., computing device 506) receives the set of voice recordings. The computing device may identify a subset of voice recordings from the received set of refined voice recordings.

The computing device may time-align the identified subset of voice recordings. Time aligning the voice recordings may prevent processing of redundant or duplicate portions of the given voice command. For instance, a first NMD and a second NMD may have recorded at least a portion of a given voice command at a given time. The first NMD may have recorded some overlapping portion at a given time in which the second NMDs may have been recording. Accordingly, the computing device may time-align the voice recordings from the first and second NMDs and refine or strip out the overlapping portions of the voice recordings according to various criteria described herein.

In some examples, the computing device may take the magnitude-weighted average of the identified subset of voice recordings. A respective portion of a voice recording with a higher magnitude (e.g., higher sound pressure level) may be given a higher weight and may be more likely to be processed to determine the given voice command.

In other examples, the computing device may combine the recordings by determining an average of the identified subset of voice recordings. Such an average may be weighted according to microphone quality and/or quantity of respective NMDs. Some NMDs may have multiple microphones and some NMDs may have better quality microphones than other NMDs. Accordingly, the computing device may determine the magnitude-weighted average of the identified subset of voice recordings based on such factors.

The computing device may "chop" the identified subset of voice recordings and splice them together. For example, at noted above, a user may be moving from the living room to the bedroom of a household while providing a given voice command. Based on determining the relative orientation or direction of the identified subset of voice recordings of respective NMDs, the computing device may use the identified subset of voice recordings from the living room as the first portion from which to determine the given voice command and the identified subset of voice recordings from the bedroom as the second portion from which to determine the given voice command.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A first networked microphone device (NMD) comprising:
one or more amplifiers configured to drive one or more speakers;
a microphone array;
a network interface;
one or more processors;
tangible, non-transitory computer-readable media having stored therein instructions executable by the one or more processors to cause the first NMD to perform a method comprising:
continuously recording, via the microphone array, audio into a buffer;
detecting, in the recorded audio, a wake-word;
in response to detecting the wake-word, (i) listening, via the microphone array, for a voice command following the wake-word in the recorded audio and (ii) sending, via the network interface, instructions to one or more second NMDs connected via to the first NMD via a local area network, the instructions causing the one or more second NMDs to stop recording audio via respective microphone arrays of the one or more second NMDs for a pre-defined time period;
querying, via the network interface, one or more servers of a particular voice assistant service with the voice command following the detected wake-word within the recorded audio;

receiving, from one or more servers of the particular voice assistant service via the network interface in response to the query, a playback command corresponding to the voice command; and playing back audio content according to the playback command via the one or more amplifiers configured to drive one or more speakers.

2. The first NMD of claim 1, wherein the voice command includes an indication of a period of time for the first NMD to listen for the voice command, and wherein the method further comprises sending, via the network interface, instructions to one or more second NMDs connected via to the first NMD via the local area network, the instructions causing the one or more second NMDs to stop recording audio via respective microphone arrays of the one or more second NMDs for the period of time indicated by the voice command.

3. The first NMD of claim 2, wherein the method further comprises:
  determining, based on the recorded audio in the buffer, that the first NMD is no longer receiving the voice command, and
  based on determining that the first NMD is no longer receiving the voice command, sending, via the network interface, instructions to one or more second NMDs connected via to the first NMD via the local area network, the instructions causing the one or more second NMDs to start recording audio via respective microphone arrays of the one or more second NMDs before the period of time indicated by the voice command has fully elapsed.

4. The first NMD of claim 1, wherein the method further comprises:
  determining, based on the recorded audio in the buffer, that the first NMD is no longer receiving the voice command, and
  based on determining that the first NMD is no longer receiving the voice command, sending, via the network interface, instructions to one or more second NMDs connected via to the first NMD via the local area network, the instructions causing the one or more second NMDs to start recording audio via respective microphone arrays of the one or more second NMDs before the pre-defined time period has fully elapsed.

5. The first NMD of claim 1, wherein the playback command comprises a command to play back particular audio content in a first zone that includes the first NMD and a second zone that includes a second NMD, and wherein the method further comprises:
  instructing, via the network interface, the second NMD of the second zone to play back the audio content according to the playback command in synchrony with playback of the audio content by the first NMD of the first zone.

6. The first NMD of claim 1, wherein a first zone of a media playback system includes the first NMD, and wherein the first zone is configured into a zone group with a second zone that includes one or more playback devices, and wherein playing back the audio content according to the playback command comprises playing back the audio content in synchrony with one or more playback devices of the second zone.

7. The first NMD of claim 1, wherein a first zone of a media playback system includes the first NMD and a second NMD in a bonded zone configuration in which the first NMD and the second NMD play respective channels of the audio content, and wherein playing back the audio content according to the playback command comprises playing back a first channel of the audio content in synchrony the second NMD playing back a second channel of the audio content.

8. Tangible, non-transitory, computer-readable media having instructions encoded therein, wherein the instructions, when executed by one or more processors, cause a first networked microphone device (NMD) to perform a method comprising:
  continuously recording, via a microphone array of the first NMD, audio into a buffer;
  detecting, in the recorded audio, a wake-word;
  in response to detecting the wake-word, (i) listening, via a microphone of the first NMD, for a voice command following the wake-word in the recorded audio and (ii) sending, via a network interface, instructions to one or more second NMDs connected via to the first NMD via a local area network, the instructions causing the one or more second NMDs to stop recording audio via respective microphone arrays of the one or more second NMDs for a pre-defined time period;
  querying, via a network interface of the first NMD, one or more servers of a particular voice assistant service with the voice command following the detected wake-word within the recorded audio;
  receiving, from one or more servers of the particular voice assistant service via the network interface in response to the query, a playback command corresponding to the voice command; and
  playing back audio content according to the playback command via one or more amplifiers configured to drive one or more speakers.

9. The tangible, computer readable media of claim 8, wherein the voice command includes an indication of a period of time for the first NMD to listen for the voice command, and wherein the method further comprises sending, via the network interface, instructions to one or more second NMDs connected via to the first NMD via the local area network, the instructions causing the one or more second NMDs to stop recording audio via respective microphone arrays of the one or more second NMDs for the period of time indicated by the voice command.

10. The tangible, computer readable media of claim 9, wherein the method further comprises:
  determining, based on the recorded audio in the buffer, that the first NMD is no longer receiving the voice command, and
  based on determining that the first NMD is no longer receiving the voice command, sending, via the network interface, instructions to one or more second NMDs connected via to the first NMD via the local area network, the instructions causing the one or more second NMDs to start recording audio via respective microphone arrays of the one or more second NMDs before the period of time indicated by the voice command has fully elapsed.

11. The tangible, computer readable media of claim 8, wherein the method further comprises:
  determining, based on the recorded audio in the buffer, that the first NMD is no longer receiving the voice command, and
  based on determining that the first NMD is no longer receiving the voice command, sending, via the network interface, instructions to one or more second NMDs connected via to the first NMD via the local area network, the instructions causing the one or more second NMDs to start recording audio via respective microphone arrays of the one or more second NMDs before the pre-defined time period has fully elapsed.

12. The tangible, computer readable media of claim 8, wherein the playback command comprises a command to play back particular audio content in a first zone that includes the first NMD and a second zone that includes a second NMD, and wherein the method further comprises:
  instructing, via the network interface, the second NMD of the second zone to play back the audio content according to the playback command in synchrony with playback of the audio content by the first NMD of the first zone.

13. The tangible, computer readable media of claim 8, wherein a first zone of a media playback system includes the first NMD, and wherein the first zone is configured into a zone group with a second zone that includes one or more playback devices, and wherein playing back the audio content according to the playback command comprises playing back the audio content in synchrony with one or more playback devices of the second zone.

14. The tangible, computer readable media of claim 8, wherein a first zone of a media playback system includes the first NMD and a second NMD in a bonded zone configuration in which the first NMD and the second NMD play respective channels of the audio content, and wherein playing back the audio content according to the playback command comprises playing back a first channel of the audio content in synchrony the second NMD playing back a second channel of the audio content.

15. A method comprising:
  a first networked microphone device (NMD) continuously recording, via a microphone array of the first NMD, audio into a buffer;
  the first NMD detecting, in the recorded audio, a wake-word;
  in response to detecting the wake-word, the first NMD (i) listening, via a microphone of the first NMD, for a voice command following the wake-word in the recorded audio and (ii) sending, via a network interface, instructions to one or more second NMDs connected via to the first NMD via a local area network, the instructions causing the one or more second NMDs to stop recording audio via respective microphone arrays of the one or more second NMDs for a pre-defined time period;
  the first NMD querying, via a network interface of the first NMD, one or more servers of a particular voice assistant service with the voice command following the detected wake-word within the recorded audio;
  the first NMD receiving, from one or more servers of the particular voice assistant service via the network interface in response to the query, a playback command corresponding to the voice command; and
  the first NMD playing back audio content according to the playback command via one or more amplifiers configured to drive one or more speakers.

16. The method of claim 15, wherein the voice command includes an indication of a period of time for the first NMD to listen for the voice command, and wherein the method further comprises sending, via the network interface, instructions to one or more second NMDs connected via to the first NMD via the local area network, the instructions causing the one or more second NMDs to stop recording audio via respective microphone arrays of the one or more second NMDs for the period of time indicated by the voice command.

17. The method of claim 15, wherein the method further comprises:
  determining, based on the recorded audio in the buffer, that the first NMD is no longer receiving the voice command, and
  based on determining that the first NMD is no longer receiving the voice command, sending, via the network interface, instructions to one or more second NMDs connected via to the first NMD via the local area network, the instructions causing the one or more second NMDs to start recording audio via respective microphone arrays of the one or more second NMDs before the pre-defined time period indicated by the voice command has fully elapsed.

18. The method of claim 17, wherein the method further comprises:
  determining, based on the recorded audio in the buffer, that the first NMD is no longer receiving the voice command, and
  based on determining that the first NMD is no longer receiving the voice command, sending, via the network interface, instructions to one or more second NMDs connected via to the first NMD via the local area network, the instructions causing the one or more second NMDs to start recording audio via respective microphone arrays of the one or more second NMDs before the pre-defined time period has fully elapsed.

19. The method of claim 15, wherein a first zone of a media playback system includes the first NMD, and wherein the first zone is configured into a zone group with a second zone that includes one or more playback devices, and wherein playing back the audio content according to the playback command comprises playing back the audio content in synchrony with one or more playback devices of the second zone.

20. The method of claim 15, wherein a first zone of a media playback system includes the first NMD and a second NMD in a bonded zone configuration in which the first NMD and the second NMD play respective channels of the audio content, and wherein playing back the audio content according to the playback command comprises playing back a first channel of the audio content in synchrony the second NMD playing back a second channel of the audio content.

* * * * *